United States Patent [19]
Haddleton et al.

[11] Patent Number: 5,804,632
[45] Date of Patent: Sep. 8, 1998

[54] PRODUCTION OF POLYMER EMULSIONS

[75] Inventors: David Mark Haddleton, Kenilworth; John Christopher Padget, Frodsham, both of United Kingdom; Gerardus Cornelis Overbeek, Waalwijk, Netherlands

[73] Assignees: Zeneca Limited, London, England; Zeneca Resins BV, Vaalwijk, Netherlands

[21] Appl. No.: 591,442

[22] PCT Filed: Aug. 2, 1994

[86] PCT No.: PCT/GB94/01692

§ 371 Date: Jan. 29, 1996

§ 102(e) Date: Jan. 29, 1996

[87] PCT Pub. No.: WO95/04767

PCT Pub. Date: Feb. 16, 1995

[30] Foreign Application Priority Data

Aug. 5, 1993 [GB] United Kingdom .................... 9316221

[51] Int. Cl.⁶ ....................................................... C08F 2/16
[52] U.S. Cl. ........................................... 524/458; 524/460
[58] Field of Search ..................... 524/460, 458

[56] References Cited

U.S. PATENT DOCUMENTS

| | | | |
|---|---|---|---|
| 4,151,143 | 4/1979 | Blank et al. | 260/29.6 |
| 4,414,370 | 11/1983 | Hamielec et al. | 526/88 |
| 4,526,945 | 7/1985 | Carlson et al. | 526/145 |
| 4,529,787 | 7/1985 | Schmidt et al. | 526/317 |
| 4,546,160 | 10/1985 | Brand et al. | 526/320 |
| 4,628,071 | 12/1986 | Morgan | 524/832 |
| 4,680,352 | 7/1987 | Janowicz et al. | 526/147 |
| 4,680,354 | 7/1987 | Lin et al. | 526/172 |
| 4,722,984 | 2/1988 | Janowicz | 526/123 |
| 4,746,713 | 5/1988 | Janowicz et al. | 526/170 |
| 4,845,149 | 7/1989 | Frazee | 524/458 |
| 4,876,313 | 10/1989 | Lorah | 525/281 |
| 4,879,333 | 11/1989 | Frazee | 524/460 |
| 4,886,861 | 12/1989 | Janowicz | 526/145 |
| 4,894,397 | 1/1990 | Morgan et al. | 523/201 |
| 4,904,724 | 2/1990 | Auchter et al. | 524/458 |
| 4,954,558 | 9/1990 | Tsaur | 525/560 |
| 5,010,140 | 4/1991 | Antonelli et al. | 525/269 |
| 5,028,677 | 7/1991 | Janowicz | 526/329.7 |
| 5,081,166 | 1/1992 | Kiehlbauch et al. | 523/201 |
| 5,264,530 | 11/1993 | Damon et al. | 526/194 |
| 5,306,743 | 4/1994 | Klesse et al. | 523/201 |
| 5,362,826 | 11/1994 | Berge et al. | 562/194 |
| 5,371,151 | 12/1994 | Berge et al. | 525/377 |

FOREIGN PATENT DOCUMENTS

| | | | |
|---|---|---|---|
| 2066988 | 10/1992 | Canada | C08F 2/16 |
| 0 196 783 | 10/1986 | European Pat. Off. | C08F 2/38 |
| 199 436 | 10/1986 | European Pat. Off. | |
| 0 259 842 | 3/1988 | European Pat. Off. | C09J 3/14 |
| 0 261 942 | 3/1988 | European Pat. Off. | C08F 2/38 |
| 257 567 | 3/1988 | European Pat. Off. | |
| 338 486 | 10/1989 | European Pat. Off. | |
| 0 522 791 A1 | 1/1993 | European Pat. Off. | C08F 265/02 |
| 0 534 695 A1 | 3/1993 | European Pat. Off. | C08F 2/10 |
| WO 87/03605 | 6/1987 | WIPO | C08F 4/39 |
| WO 93/22351 | 11/1993 | WIPO | C08F 2/42 |
| WO 93/22355 | 11/1993 | WIPO | C08F 20/54 |
| WO 95/04759 | 2/1995 | WIPO | C08F 2/38 |

OTHER PUBLICATIONS

Enikolopyan et al, J. Polym. Sc. Polymer Chem. Ed., 19:879 (1981).

Cacioli et al, J. Macromol. Sci.–Chem., A23 (7), pp. 839–852 (1986).

*Primary Examiner*—Peter D. Mulcahy
*Attorney, Agent, or Firm*—Pillsbury Madison & Sutro LLP

[57] ABSTRACT

Process for the production of an aqueous polymer emulsion which process comprises:

a) preparing a low molecular weight polymer containing acid-functional groups using a free-radical polymerisation process which employs a free-radical initiator and, for the purpose of controlling molecular weight, a transition metal chelate complex, wherein said low molecular weight polymer has a number average molecular weight within the range of from 500 to 50,000;

b) conducting an aqueous emulsion polymerisation process to form an aqueous emulsion of a hydrophobic polymer from at least one olefinically unsaturated monomer, wherein the low molecular weight polymer of step a) is introduced to the aqueous medium of said emulsion polymerisation process before the start of and/or during said emulsion polymerisation process and becomes dissolved or dispersed in said aqueous medium.

48 Claims, No Drawings

PRODUCTION OF POLYMER EMULSIONS

This application claims benefit of international application PCT/GB94/01692, filed Aug. 2, 1994.

The present invention relates to a process for the production of aqueous emulsions of certain polymer systems, to the aqueous emulsions so produced, and to their use in various applications.

The use of aqueous emulsions of polymers, commonly known as aqueous polymer latices, is well known in the art for numerous applications, and in particular for the provision of the binder material in coating applications.

It is known for some applications to be advantageous to employ an aqueous emulsion of a polymer system, containing a low molecular weight hydrophilic polymer and a hydrophobic emulsion polymer, that has been produced by a multistage process and in which (often) the hydrophilic polymer has been solubilised in the aqueous medium. Such latices may provide improvements in mechanical, physical or performance properties in comparison to conventional emulsion polymers.

U.S. Pat. No. 4894397, in particular, discloses the production of a latex in which a hydrophilic low-molecular weight polymer emulsion is formed in a first stage, and this is contacted with at least one hydrophobic, latex-forming monomer under polymerisation conditions to form a hydrophobic second-stage polymer, the pH of the resulting emulsion, said to be in the form of an inverse core-shell latex, being adjusted so as to dissolve the hydrophilic polymer, so creating a continuous aqueous phase of the hydrophilic polymer and discrete stabilized particles of the hydrophobic polymer.

In U.S. Pat. No. 4954558, on the other hand, a resin-fortified polymer emulsion is formed by emulsion-polymerising a monomer charge and adding to the polymerisation medium during the polymerisation a low-molecular weight support resin which is soluble or dispersible in water or alkali.

We have now discovered how to prepare aqueous emulsions of polymer systems comprising a low molecular weight acid-functional polymer and a hydrophobic polymer which have significant advantages in comparison to known emulsion polymer systems of this type.

According to the present invention there is provided a process for the production of an aqueous polymer emulsion which process comprises:

a) preparing a low molecular weight polymer containing acid-functional groups using a free-radical polymerisation process which employs a free-radical initiator and, for the purpose of controlling molecular weight, a transition metal chelate complex, particularly a cobalt chelate complex, wherein said low molecular weight polymer has a number average molecular weight within the range of from 500 to 50,000;

b) conducting an aqueous emulsion polymerisation process to form an aqueous emulsion of a hydrophobic polymer from at least one olefinically unsaturated monomer, wherein the low molecular weight polymer of step a) is introduced to the aqueous medium of said emulsion polymerisation process before the start of and/or during said emulsion polymerisation process and becomes dissolved or dispersed in said aqueous medium.

In one embodiment of the invention, the low molecular weight acid-functional polymer becomes dissolved in the aqueous medium of the emulsion polymerisation of step b) and such dissolution in the aqueous medium may be effected or take place, subject of course to when it is added to the aqueous medium, prior to the start of the polymerisation of step b), during the polymerisation of step b), subsequent to the polymerisation of step b), or over two or more of these stages. Usually dissolution is effected prior to the start of polymerisation b) or during the polymerisation of b) or over both stages. Dissolution of the low molecular weight polymer is often achieved by neutralization of the acid groups, e.g. by raising the pH of the aqueous medium. Dispersion of the low molecular weight polymer in the aqueous medium may also be facilitated by neutralization of acid groups of the low molecular weight polymer.

There is also provided an aqueous polymer emulsion which is formable by a process as defined supra.

There is further provided the use of an aqueous polymer emulsion as defined supra in coating applications, and in particular in graphic arts applications such as inks and overprint lacquers. (The term "low molecular weight polymer" is sometimes called an oligomer herein for convenience).

By the low molecular weight polymer becoming dispersed in the aqueous medium of the emulsion polymerisation of step b) is meant that the polymer, although not dissolved, becomes dispersed as particles sufficiently small to be substantially non-settling in the medium, and such a dispersion is particularly a colloidal dispersion of the polymer particles (as in a polymer latex or emulsion). It will also be appreciated that the low molecular weight polymer could be introduced to the aqueous medium so that it is initially dispersed therein and subsequently caused to become dissolved (e.g. by neutralization) in the aqueous medium, or vice versa. Sometimes, of course, the distinction between colloidal dispersions and true solutions is difficult to distinguish, a situation intermediate these states existing; or some of the polymer could be dispersed in the aqueous medium and some could be dissolved. Thus the phrase "becomes dissolved or dispersed in the aqueous medium" is also intended to embrace a final disposition of the low molecular weight polymer in the aqueous medium of the emulsion polymerisation which corresponds to such intermediate states.

The acid-functional low molecular weight polymer may contain a sufficient concentration of acid functionality to render the polymer partially or more preferably fully dissolvable in an aqueous medium, if necessary by neutralisation of acid groups of the polymer, as would e.g. be achieved by adjustment of the pH of the aqueous medium. Thus, in the cases where dissolution of the low molecular weight polymer in the aqueous medium of the emulsion polymerisation of step b) is required, the polymer should be selected so that it has sufficient acid functionality to render it soluble in that aqueous medium, such dissolution being effected if necessary by adjustment of the pH of the medium so as to neutralize the acid-functional groups thereof. (If the acid-functional low molecular weight polymer had only sufficient acid functionality to render it partially dissolvable in the aqueous medium of the emulsion, it could exist as a colloidal dispersion or intermediate between a colloidal dispersion and a true solution or could be partly dispersed and partly dissolved.) Usually, the medium in which the low molecular weight polymer finds itself will be acidic (pH <7) and the acid groups will be carboxyl groups so that dissolution will be effected by raising the pH of the medium so as to neutralize the acid groups by the addition of a base, such as an organic or inorganic base, examples of which include organic amines such as trialkylamines (e.g. triethylamine, tributylamine), morpholine and alkanolamines, and inorganic bases such as ammonia, NaOH, KOH and LiOH. Of course, the aqueous medium to which the low molecular weight acid functional polymer is introduced may already be alkaline (or sufficiently alkaline) such that the acid groups (such as carboxyl groups) become neutralized without the requirement for positively adding a base to raise pH, or the acid groups may be or include very strong acid groups such as sulphonic acid groups (pK 1 to 2) so that neutralisation may not be necessary to achieve dissolution. Further still, it is possible for acid monomers to be polymerised in salt form rather than as the free acid.

It may, further, be possible for the acid-functional low molecular weight polymer to possess a sufficient concentration of acid functionality to render it fully dissolvable in an aqueous medium by neutralization of the acid groups—but in the process of the invention such neutralization may not necessarily be effected, or there is only partial neutralization so that the low molecular polymer ends up as dispersed rather than dissolved.

The aqueous emulsion polymerisation of step b) yields a hydrophobic emulsion polymer, this type of polymer being well understood by those skilled in the art. Generally speaking it may be considered herein as a water-insoluble polymer whose water-insolubility is maintained throughout the pH range. The hydrophobic nature of the polymer is achieved by virtue of the polymer containing a sufficient concentration of at least one hydrophobic monomer (i.e. in polymerised form) to render the polymer hydrophobic and water-insoluble throughout the pH range. Thus the emulsion polymer formed in the emulsion polymerisation process of step b) is insoluble in the aqueous medium of that polymerisation process regardless of any adjustments in pH to which the medium could be subjected.

The low molecular weight acid functional polymer formed in step a) is produced using the technique of free radical polymerisation, using a free-radical initiator, in which molecular weight is controlled using a catalytic amount of a transition metal complex, and in particular a cobalt chelate complex, this technique being known in the art as catalytic chain transfer (CCT) polymerisation.

Such a technique has been described fairly extensively in the literature within the last decade or so. For example, various literature references, such as N. S. Enikolopyan et al, J.Polym.Sci., Polym.Chem.Ed., Vol 19, 879 (1981), disclose the use of cobalt II porphyrin complexes as chain transfer agents in free radical polymerisation, while U.S. Pat. No. 4526945 discloses the use of dioxime complexes of cobalt II for such a purpose. Various other publications, e.g. U.S. Pat. No. 4680354, EP-A-0196783 and EP-A-0199436, describe the use of certain other types of cobalt II chelates as chain transfer agents for the production of oligomers of olefinically unsaturated monomers by free-radical polymerisation. WO-A-87/03605 on the other hand claims the use of certain cobalt III chelate complexes for such a purpose, as well as the use of certain chelate complexes of other metals such as iridium and rhenium.

The metal chelate complexes disclosed in these references as well as the specific polymerisation techniques disclosed therein for effecting catalytic chain transfer polymerisation are incorporated herein by reference, and any suitable metal chelate complex may be employed in the production of the low molecular weight acid functional polymer used in the present invention.

Perhaps typical of such metal chelate complexes are those described in EP-A-199436 which are cobalt II chelates of vicinal iminohydroxyimino compounds, dihydroxyimino compounds, diazadihydroxy-iminodialkyldecadienes and diazadihydroxyiminodialkylundecadienes, optionally including bridging groups such as $BF_2$ and optionally coordinated with further ligands such as water, alcohols, ketones, and nitrogen bases such as pyridine. Particularly preferred in these are optionally hydrated Co II (2,3-dioxyiminobutane-$BF_2)_2$, Co II (1,2-dioxyiminocyclohexane-$BF_2)_2$ and Co II (1,2-diphenyl-1,2-dioxyiminoethane-$BF_2)_2$. The spatial arrangements in such complexes are set out in the specification of EP-A-199436.

Other cobalt II chelates that we have found useful are described in our copending GB application 9316525.6, a particularly useful example of which is 2,12-dimethyl-3,7,11,17-tetraazabicyclo [11.3.1] heptadeca-1(17),2,11,13,15-pentaene cobalt (II) bromide monohydrate which may be obtained as described by D. H. Busch and K. M. Long in Inorganic Chemistry, 9(3), 511, (1970).

The metal chelate complex allows the efficient production of oligomers and may be acting as a chain transfer agent, although its precise mode of action in molecular weight control is uncertain to us.

The CCT polymerisation process can be carried out in the presence of a polymerisation medium (acting as a carrier medium for the components and as a heat transfer medium) or in the absence of such a medium (i.e. in bulk). When using a polymerisation medium, the polymerisation may be e.g. a solution, suspension or emulsion polymerisation. For the purpose of the present invention the polymerisation is preferably effected by aqueous polymerisation methods, for example by suspension or emulsion polymerisation (typical emulsifying agents for which are described hereinafter in relation to the formation of the hydrophobic polymer).

Typical organic solvents which may be used as the medium for the CCT polymerisation include aromatic hydrocarbons such as benzene, toluene, and the xylenes; ethers such as diethyl ether, tetrahydrofuran, alkoxylated ethylene glycol or polyethylene glycol; alcohols such as methanol, ethanol, propanol, isopropanol, butanol and n-butylglycol, and their esters with carboxylic acids such as acetic, propionic and butyric acids; ketones such as acetone or methyl ethyl ketones; and liquid tertiary amines such as pyridine. Mixtures of solvents may be used. The solids content in such solution polymerisation may range from 0.1 to 99.9 wt % solids. Water may also be used as a polymerisation medium (and indeed is preferred), as in suspension or emulsion polymerisations (solids typically 5–50 wt % preferably 20–40 wt %), and for such processes conventional emulsifying or suspension agents may be employed. A combination of water and a water-miscible organic solvent (s) may also be used as a polymerisation medium.

It is particularly preferred to use an aqueous emulsion polymerisation process in the CCT polymerisation to form the low molecular weight polymer.

The CCT polymerisations are usually performed at a temperature within the range of 20° to 200° C. (more usually 40° to 150° C.). Any suitable free radical yielding initiator may be used in the CCT polymerisation process, the usual criteria being that it has acceptable solubility in one or more of the other polymerisation components (e.g. solvent, monomers, or water) and is sufficiently active at the polymerisation temperature (usually having a half life within the range 0.5 to 5 hours), and does not unacceptably affect the stability of the chain transfer catalyst being used. Thus, the initiator may be selected from such free-radical-yielding initiators which may include azo compounds such as 2,2'-azobis (isobutyronitrile), 4,4'-azobis(4-cyanovaleric acid), 2,2'-azobis [2-methyl-N-(1,1-bis(hydroxymethyl)-2-(hydroxyethyl)]-propionamide, and 2,2'-azobis[2-methyl-N-

(2-hydroxyethyl)]-propionamide and peroxy compounds such as lauroyl peroxide, benzoyl peroxide, and Na, K or ammonium persulphate. Redox initiator systems can also be used, such as redox pairs like ammonium persulphate/ sodium metabisulphite.

The CCT polymerisation process may be carried out using an "all-in-one" batch process in which all components are present at the start of polymerisation or a semi-batch process in which one or more of the components employed (usually at least one of the monomers) is wholly or partially fed to the polymerisation medium during the polymerisation.

The chelates used in the process may be prepared beforehand or may be formed in-situ from the appropriate reactants. The amount of metal chelate required to achieve a given molecular weight is very much lower in comparison to that required with conventional chain transfer agents which are needed at much higher concentration to obtain a comparable molecular weight. For example the upper level of metal chelate needed may only be ca 0.1 mole a (based on the total weight of monomer charged)—whereas U.S. Pat. No. 4894397 for example states that >0.3 mole % of conventional chain transfer agent, based on the total molar weight of the monomer charge, is required in the production of the low molecular hydrophilic polymer, with 1 to 3 mole% being preferred.

The monomer system used for the preparation of the acid functional low molecular weight polymer is any suitable olefinically unsaturated monomer(s) which is amenable to (co)polymerisation using CCT polymerisation, and can provide, directly or after suitable conversion, the required acid functionality. Such a monomer system is usually that to provide a copolymer of an olefinically unsaturated acid-functional comonomer(s) (preferably in sufficient concentration to render the resulting polymer fully or partially soluble in aqueous media as discussed supra), such a comonomer(s) including a comonomer(s) bearing an acid-forming group which readily yields such an acid group (such as an anhydride, e.g. methacrylic anhydride or tertiary butyl methacrylate), and a non-acid-functional olefinically unsaturated monomer(s) (i.e. a monomer(s) not having an acid-functional group). Typically the acid-bearing comonomers are olefinically unsaturated carboxyl-functional monomers such as mono carboxyl-functional acrylic monomers and olefinically unsaturated dicarboxyl bearing monomers; examples include acrylic acid, methacrylic acid, itaconic acid, maleic acid and fumaric acid. Sulphonic acid-bearing monomers could also be used, such as styrene p-sulphonic acid (or correspondingly styrene p-sulphonyl chloride). An acid bearing monomer could be polymerised as the free acid or as a salt, e.g. the $NH_4$ or alkali metal salts of ethylmethacrylate-2-sulphonic acid or 2-acrylamido-2-methylpropane sulphonic acid, or the corresponding free acids. Non-acid functional monomer(s) which may be copolymerized with the acid monomer(s) include alkylmethacrylates and styrenes, and alkylacrylates can also be used, particularly if included as comonomers at low levels; also dienes such as 1,3-butadiene and isoprene, and vinyl esters such as vinyl acetate. Methacrylates include normal or branched alkyl esters of C1 to C12, especially C1 to C10, alcohols and methacrylic acid, (i.e. C1 to C12, especially C1–10, alkyl methacrylates) such as methyl methacrylate, ethyl methacrylate, n-butyl methacrylate and lauryl methacrylate. Acrylates include normal and branched alkyl esters of C1 to C12, especially C1 to C10, alcohols and acrylic acid, (i.e. C1–C12, especially C1–10, alkyl acrylates) such as methyl acrylate, ethyl acrylate, n-butyl acrylate and 2-ethylhexyl acrylate. Styrenes include styrene itself and the various substituted styrenes, such as methyl styrene, α-methyl styrene and t-butyl styrene. Olefinically unsaturated nitriles such as acrylonitrile and methacrylonitrile may also be polymerised, as well as olefinically unsaturated halides such as vinyl chloride, vinylidene chloride and vinyl fluoride. Functional monomers such as allyl, glycidyl, or hydroxyalkyl (e.g. hydroxyethyl) methacrylates or acrylates may also be employed as part of the non-acid-functional comonomer component, as well as ketofunctional monomers such as the acetoacetoxy esters of hydroxyalkyl acrylates and methacrylates such as acetoacetoxyethyl methacrylate, and also keto-containing amides such as diacetone acrylamide. Amides such as acrylamide and methacrylamide may also be used. One of the purposes of using functional monomer is to provide subsequent crosslinkability in the resulting polymer system.

Typically, the acid functional low molecular weight polymer is derived from a monomer system which contains 1–60 weight % of acid comonomer(s), preferably 3–50 weight % and more preferably 5–40 weight %, and correspondingly 99–40 weight % of non acid functional comonomer(s), preferably 97–50 weight %, and more preferably 95–60 weight %.

A particularly useful monomer system is that based on 15–40 weight a acid-functional comonomer(s) (particularly methacrylic acid) and 85–60 weight % of non-acid-functional comonomer(s), as this results in a polymer emulsion which is especially suitable for providing the binder material in water-based ink and overprint lacquer formulations for the graphic arts market.

The non acid functional comonomer(s) in some cases is usefully selected from at least one of methyl methacrylate, styrene, n-butyl methacrylate and n-butyl acrylate while the acid monomer is for example methacrylic acid. Useful oligomers of this type are derived from a monomer system which comprises 10–30 weight % methacrylic acid, 50–90 weight % methyl methacrylate, 0–30 weight % of one or both of n-butyl acrylate and n-butyl methacrylate and 0–50, especially 0–40, weight % styrene. Examples of oligomers good for inks or overprint lacquer applications may be derived from a-monomer system comprising 15–40 weight % methacrylic acid, 50–85 weight % methyl methacrylate, 0–30 weight % of one or both of n-butyl methacrylate and n-butyl acrylate and 0–35 weight % styrene.

It is generally preferable, in order to maximise the efficiency of the chain transfer polymerisation, that at least one of the monomers is a monomer having a $CH=C(CH_3)$— moiety, examples of which include methacrylic acid, methacrylic acid esters and amides, and methacrylonitrile, preferably at least 5 weight % of the monomers used in the polymerisation being such a monomer(s), more preferably at least 25 weight %, and particularly at least 50 weight %. Moreover, where the monomer system employed does include such a monomer, a proportion of the hydrophilic oligomer molecules may have terminal unsaturation, inherently produced as a result of the CCT polymerisation process. This proportion may often be >80% of the oligomer molecules (see e.g. EP-A-0261942B).

The presence of such terminal unsaturation may be advantageous from the viewpoint of possibly promoting good compatibility between the low molecular weight polymer and the subsequently formed hydrophobic polymer— possibly by engendering a degree of grafting between the polymers. Such a possibility for grafting due to terminal unsaturation might obviate the need to use special monomers in the low molecular weight polymer to promote grafting when such grafting is required. Examples of such special grafting monomers are di (or poly)functional monomers with 2 (or more) sites of unsaturation (e.g. allyl methacrylate) and monomers which have one or more radically abstractable atoms. However the use of such special monomer(s) in the synthesis of the low molecular weight polymer to promote grafting is not of course precluded.

The low molecular weight polymer should have a number average molecular weight within the range of from 500–50,000, preferably 700–20,000 and particularly 1,000–10,000. (Polymer molecular weights may be determined by gel permeation chromatography calibrated using an appropriate known polymer as standard.) Preferably the polydispersity PDi (ratio of weight average to number average molecular weight) is within the range of from 1.05 to 5.0, more preferably 1.1 to 2.8.

The aqueous emulsion polymerisation process employed in step b) to form the hydrophobic polymer, may, apart from the incorporation of the acid functional low molecular weight polymer from step a), be that of a conventional aqueous emulsion polymerisation process. Such a process is extremely well known and need not be described in great detail. Suffice it to say that such a process involves introducing the monomer(s) into an aqueous medium and conducting polymerisation using a free-radical initiator (normally water soluble) and (usually) appropriate heating (e.g. 40° to 120° C.) and agitation (stirring) being employed. The aqueous emulsion polymerisation can be effected with conventional emulsifying agents being used [e.g. anionic and/or non-ionic emulsifiers such as Na, K and $NH_4$ salts of dialkylsulphosuccinates, Na, K and $NH_4$ salts of sulphated oils, Na, K and $NH_4$ salts of alkyl sulphonic acids, Na, K and $NH_4$ alkyl sulphates, alkali metal salts of sulphonic acids. $C_{12-24}$ fatty alcohols, ethoxylated fatty acids and/or fatty amides, and Na, K and $NH_4$ salts of fatty acids such as Na stearate and Na oleate; the amount used is usually 0.2 to 5%. by weight based on the weight of total monomer(s) charged] and can employ conventional free radical initiators [e.g. hydrogen peroxide, t-butyl-hydroperoxide, cumene hydroperoxide, persulphates such as $NH_4$ persulphate, K persulphate and Na persulphate; redox systems may be used; the amount is generally 0.05 to 3% based on the weight of total monomers charged]. However, an additional feature of the invention is that it is often possible to eliminate or much reduce the requirement for a surfactant to act as an emulsifier for the polymerisation of step b), because the acid functional low molecular polymer itself can fulfill such a function (i.e. act as an emulsifying agent).

As with the CCT polymerisation process, the emulsion polymerisation process of this step may be carried out using an "all-in-one" batch process (i.e. a process in which all the components to be employed are present in the polymerisation medium at the start of polymerisation) or a semi-batch process in which one or more of the components employed (usually at least one of the monomers, or the monomer if only one is being polymerised) is wholly or partially fed to the polymerisation medium during the polymerisation. The monomer(s) can be fed neat or as emulsions in water. When more than one monomer is being added, the composition of the monomer feed in the semi-batch process may be varied during the feed operation as is well known in the art. Although not preferred, fully continuous processes could also be used.

The monomer system employed for the formation of the hydrophobic polymer must be such that the resulting polymer is hydrophobic as described. Similar non acid functional monomers to those used for making the low molecular weight polymer may be employed, and in particular styrenes, such as styrene itself, α-methylstyrene, o-, m- and p-methylstyrene, o-, m- and p-ethylstyrene, p-chlorostyrene and p-bromostyrene, esters of acrylic or methacrylic acid and alkanols i.e. alkyl acrylates and methacrylates (usually C1–12 especially C1–10 alkyl) such as methyl methacrylate, ethyl methacrylate, n-butyl methacrylate, t-butyl methacrylate, 2-ethylhexyl methacrylate, and the corresponding acrylates, vinyl esters such as vinyl acetate, vinyl halides such as vinyl chloride, vinylidene halides such as vinylidene chloride, dienes such as 1,3-butadiene and isoprene, and functional monomers such as hydroxy, epoxy and allyl functional (meth)acrylates may also be used as part of the monomer system, such as 2-hydroxyethyl methacrylate, glycidyl methacrylate, and the corresponding acrylates, as well as keto-functional monomers such as acetoacetoxy esters of hydroxyalkyl acrylates and methacrylates such as acetoacetoxyethyl acrylate or methacrylate, and also keto-containing amides such as diacetone acrylamide, and also amides such as acrylamide and methacrylamide. As with the monomers used for the preparation of the low molecular weight polymer, one of the purposes of using functional monomer in the monomer system for the hydrophobic polymer is to provide subsequent crosslinkability in the resulting polymer system.

Acid functional monomers could also be included as comonomers (e.g. acrylic or methacrylic acid), although at such a level (depending on their nature) as to not affect the hydrophobic character of the resulting polymer. Generally speaking, the monomer system used to make the hydrophobic polymer will usually contain less than 10 weight % of any acid-functional monomer(s) (no matter of what type), and preferably less than 5 weight %, and in some preferred embodiments none at all. Generally speaking the concentration of acid functional monomer units (wt % basis) in the hydrophobic polymer will usually be less than the concentration of acid functional monomer units in the low molecular weight acid functional polymer.

The hydrophobic polymer is in some cases usefully made from a monomer system which comprises at least one of styrene, $C_{1-12}$, especially $C_{1-10}$-alkyl methacrylate (such as methyl methacrylate), and $C_{1-12}$ especially $C_{1-10}$-alkyl acrylate (such as ethyl acrylate) . The monomer system may contain only one monomer, i.e. the resulting hydrophobic polymer then essentially being a homopolymer; styrene (alone) for example may be used for the provision of the hydrophobic polymer in this stage of the invention process. The hydrophobic polymer can also be a copolymer of course.

The polymerisation to make the hydrophobic polymer could be carried out using a chain transfer agent, conventional or otherwise, but is usually effected without the use of such a material.

The number average molecular weight of the hydrophobic polymer is usually $\geq 50,000$, more usually $\geq 100,000$. The upper limit does not usually exceed 5,000,000.

The number average molecular weight of the overall or hybrid polymer system (i.e. inclusive of both the low molecular weight polymer and the hydrophobic polymer) is often within the range of from 5,000 to 1,000,000.

The low molecular weight acid functional polymer is introduced to the aqueous medium of the emulsion polymerisation to make the hydrophobic polymer before the start of and/or during the emulsion polymerisation and becomes dissolved or dispersed in the aqueous medium. Such dissolution or dispersion may be realized in many different ways, including the following possibilities.

Where the low molecular weight acid functional polymer has been formed by a solution (in organic solvent) or aqueous suspension polymerisation process, it is usually first isolated from its polymerisation medium to provide solid polymer which may then be dissolved in an aqueous medium, suitably alkaline if this is necessary for such dissolution (neutralization of the acid group taking place), which can then serve as the basis (in part or in whole) for the aqueous polymerisation medium for the hydrophobic polymer formation. Alternatively the isolated solid could be dispersed rather than dissolved in water (possibly facilitated by neutralization) and the aqueous dispersion used as the basis for the aqueous medium of the hydrophobic polymer formation, with dissolution optionally (but preferably) being effected during or subsequent to the polymerisation to form the hydrophobic polymer (again, facilitated by neutralization if necessary). A water-miscible organic solvent solution of the low molecular weight polymer could alternatively simply be diluted with water (which could be alkaline if necessary to effect neutralization, or the polymer could possibly already be neutralized before the dilution with water) so as to provide an aqueous solution or dispersion of the low molecular weight polymer, again using the aqueous solution or dispersion for providing the basis of the polymerisation medium for the subsequent emulsion polymerisation; in this case the organic solvent could optionally be removed before or after the subsequent polymerisation.

Alternatively the isolated polymer, either as a solid per se, or as a dispersion in water, or as an aqueous solution (alkaline if necessary), could be added to the aqueous polymerisation medium for the hydrophobic polymer during the course of the emulsion polymerisation (in one or more stages) so that it becomes dissolved or dispersed in the aqueous medium, with dissolution being preferred and being effected or taking place during or subsequent to the polymerisation, the pH of the aqueous polymerisation medium being adjusted if necessary (although of course it may not be necessary) with a base to neutralise the acid groups.

Where the low molecular weight polymer is formed using an aqueous emulsion polymerisation process, while the acid functional low molecular weight polymer may be isolated from the water carrier medium and used as described above, it is more preferable that the resulting aqueous emulsion of the low molecular weight polymer is used as the basis for providing (in part or in whole) the polymerisation medium for the subsequent polymerisation to form the hydrophobic polymer (with optional but preferred dissolution in the aqueous medium being effected or taking place prior to, during or subsequent to the hydrophobic polymer polymerisation—usually by neutralising acid groups of the low molecular polymer). This has the advantage that the polymerisation to form the hydrophobic polymer can be carried out in the same reaction vessel used to form the low molecular weight polymer ("one-pot" system), although different vessels could be used if desired of course. Also, in such a system, at least some of the components used for the emulsion polymerisation to form the low molecular weight polymer, e.g. the emulsifying agent and/or free radical initiator, could (if remaining in sufficient quantity) be carried over for use in the emulsion polymerisation process to make the hydrophobic polymer and might even render the requirement for further addition of such components unnecessary (although fresh or further amounts of components, which will not necessarily be the same for both polymerisations, will in fact normally be required). Also, as mentioned above, the low molecular weight polymer itself can be deployed to act as an emulsifying agent for the polymerisation.

Alternatively, the aqueous emulsion of the low molecular weight polymer could be added to the aqueous medium for the hydrophobic polymer during the hydrophobic polymer polymerisation, with optional but preferred dissolution in the medium being effected or taking place, if necessary by neutralisation of acid groups, during or subsequent to the polymerisation.

In at least some embodiments of the invention, particularly those in which the low molecular weight polymer is introduced to the aqueous medium for the hydrophobic polymer before the start of the polymerisation for the latter's formation, it is believed that the aqueous emulsion produced after the formation of the hydrophobic polymer and before any neutralisation may be in the form of an "inverted core-shell" latex, in which the hydrophobic polymer has formed a core domain in the low molecular weight polymer—with low molecular weight polymer encapsulating the hydrophobic polymer particles or forming a shell round them, or carrying the hydrophobic polymer particles in its swollen matrix, and that upon neutralisation such to dissolve the low molecular weight polymer, the aqueous phase containing low molecular weight polymer provides a continuous phase in which there is a discontinuous phase containing discrete stabilised particles of the hydrophobic polymer. The emulsion polymer system discussed in U.S. Pat. No. 4894397 is, for example, described in such terms. Alternatively, it may (in such embodiments and also in other embodiments) be more realistic to speak of the low molecular weight polymer simply in terms of being a seed for the polymerisation process to form the hydrophobic polymer—irrespective of the actual structure of the resulting polymer system that is produced, of which we are not entirely certain. Accordingly, we do not wish to be bound by any physical structure which might be assumed or proposed for the resulting aqueous latex of the polymer system of the invention.

The use of CCT polymerisation to form the low molecular weight polymer brings a number of significant advantages to the aqueous emulsions of the invention.

The CCT technique avoids the requirement to use conventional chain transfer agents which often have disadvantages of one sort or another. For example, mercaptans (as used e.g. in U.S. Pat. No. 4894397) impart a pronounced odour, while halogenated hydrocarbons (such as bromoform or carbon tetrachloride) are environmentally suspect. The process of the invention thus allows low odour both in the oligomer and in the final composite polymer emulsion. α-Methyl styrene (another known chain transfer agent), on the other hand, is very expensive and often has to be used in very high levels, e.g. up to 35 weight % (although its deliberate use as a comonomer is not of course precluded). In some instances, the CCT technique may be the only viable method of producing very low molecular weight polymers.

The metal chelate, acting to control molecular weight, may be used in a very low amount (because it acts in a catalytic manner) in comparison to conventional chain transfer agents for achieving comparable molecular weight reduction. This allows a much purer product to be made.

The low molecular weight polymer formed by the CCT polymerisation can have a narrower molecular weight distribution than when a polymerisation process using a conventional chain transfer agent is employed. This narrow molecular weight distribution provides a number of advantages in terms of the lower solution viscosity of an aqueous alkaline solution of the low molecular weight polymer: e.g. one can have lower solution viscosity for a given number average molecular weight; one can have higher oligomer number average molecular weight for a given solution viscosity (and hence improved performance properties); and one can use certain comonomers which would otherwise lead to excessive solution viscosities.

When the low molecular weight polymer is made using an aqueous emulsion polymerisation process, there are the advantages that the entire process can be made "one pot" if desired (as discussed above) and that the product can be totally free from organic solvent.

In a further embodiment of the invention, one or both of the low molecular weight polymer and the hydrophobic polymer possess functional groups for imparting latent crosslinkability to the composition (i.e. so that crosslinking takes place e.g. after the formation of a coating therefrom). For example, both polymers can carry coreactive groups, e.g. amino groups on one of the polymers and epoxy groups on the other, or keto or aldehyde carbonyl groups on one of the polymers and amino groups on the other, so that a selfcrosslinking (1-pack) system could be envisaged. Alternatively, one or both polymers could carry functional groups such as hydroxyl groups and the composition subsequently formulated with a crosslinking agent such as a polyisocyanate, melamine, or glycouril; or the functional groups on one or both polymers could include keto or aldehyde carbonyl groups and the subsequently formulated crosslinker could be a polyamine or polyhydrazide such as adipic acid dihydrazide.

The solids content of the aqueous emulsion of the invention is usually within the range of from about 20 to 65 wt % on a total weight basis, more usually 30 to 55 wt %. Solids content can, if desired, be adjusted by adding water or removing water (e.g. by distillation or ultrafiltration).

The relative amounts of the low molecular weight polymer and the hydrophobic polymer in the aqueous polymer emulsion are preferably such that the weight % of the low molecular weight polymer, based on the weight of the low molecular weight polymer plus the hydrophobic polymer in the polymer emulsion, is within the range of from 1 to 60 weight %, more preferably 3 to 40 weight %.

The aqueous emulsions of the invention may be used in various applications and for such purposes may be combined or formulated with other additives or components, such as defoamers, rheology control agents, thickeners, dispersing and stabilizing agents (usually surfactants), wetting agents, fillers, extenders, fungicides, bactericides, coalescing solvents, wetting solvents, plasticisers, anti-freeze agents, waxes and pigments.

The aqueous emulsions may e.g. be used, appropriately formulated if necessary, for the provision of films, polishes, varnishes, lacquers, paints, inks, sealants and adhesives. However, certain of them (as discussed supra) are particularly useful and suitable for providing the basis of water-based ink or overprint lacquer formulations for the graphic arts market, in which case they will be formulated with additives such as pigments (such as $TiO_2$, or carbon black). The polymer system of the aqueous emulsion is found to be particularly suitable as the binder material in such inks and will provide high performance, particularly in terms of giving a good balance of properties between press reversibility and wetting during application, and film resistance and adhesion in the dried ink.

The aqueous emulsions of the invention can also be used by recovering the polymer system thereof as dry powder, e.g. by spray drying or coagulation using an electrolyte, and the dry powder used in various applications, e.g. in aqueous compositions after redispersion or in dry powder-modified cements, where the powder is mixed with dry cement mixture to form a useful composition which can be mixed with water when required for use.

The present invention is now further illustrated, but in no way limited, by reference to the following examples. Unless otherwise specified all parts, percentages, and ratios are on a weight basis.

In the following examples the following abbreviations are used:

MMA=methyl methacrylate
MAA=methacrylic acid
St=styrene
BMA=n-butyl methacrylate
BA=n-butyl acrylate
Mn=number average molecular weight
PDi=polydispersity (ratio of Mw/Mn, where Mw is the weight average molecular weight)
Cyanovaleric acid=4,4'-azobis(4-cyanovaleric acid)
COBF=CoII(DHIB-$BF_2$)$_2$ where DHIB is 2,3-dioxyiminobutane
CoPY=Co-pydiene=2,12-dimethyl-3,7,11,17-tetraazabicyclo[11.3.1]heptadeca-1(17),2,11,13,15-pentaene cobalt (II) bromide monohydrate.
CoPhBF=CoII(DDE-$BF_2$) where DDE is 1,2-diphenyl-1,2-dioxyiminoethane
PTFE=polytetrafluoroethylene
GPC=gel permeation chromatography.
AIBN=$\alpha,\alpha^1$-azoisobutyronitrile
tBHPO=tertiary butyl hydroperoxide

PREPARATION OF SOME LOW MOLECULAR WEIGHT POLYMERS

A series of aqueous latices of CCT-prepared low molecular weight acid-functional polymers, LMP1 to LMP0 were prepared as follows.
LMP1
This was based on a MMA (70 wt %)/MAA (30 wt %.) oligomer.

The polymerisation apparatus consisted of a 5 litre baffled 3-necked round bottomed flask fitted with a stirrer, condenser and dropping funnel (500 ml capacity). The polymerisation temperature was monitorable using a thermocouple and a digital read out. The reaction was heated using a thermostatically controlled water bath.

The apparatus was evacuated and flushed with nitrogen before use.
Procedure
All monomers and water were degassed (deoxygenated) by passing a stream of nitrogen gas through them for at least one hour before use.

Degassed de-ionised water (1750 ml) was added to the polymerisation flask, which was heated by a water bath at 750° C. Sodium lauryl sulphate (15 g) was taken and added to the reactor with stirring.

A clean dry 2-necked round bottomed flask fitted with a rotaflow glass/rubber connector, magnetic stirrer bar and sealed with a suba seal was evacuated and flushed with nitrogen three times.

CoBF (0.1570 g) was taken and added to the flask, which was then re-evacuated and flushed with nitrogen three times.

Using clean dry glass syringes which had been flushed in a stream of nitrogen, methyl methacrylate (561 ml), and methacrylic acid (222 ml) were taken and added to the flask containing the CoBF with stirring. The CoBF/monomer mixture was stirred for about 30 minutes to allow the CoBF to dissolve and was then transferred by syringe to the dropping funnel.

Cyanovaleric acid (9.5 g) was taken and added to the reaction flask.

When the cyanovaleric had completely dissolved (2–3 minutes), the monomer/CoBF mixture was added at a linear rate over 60 minutes and was left for a further 60 minutes before cooling to room temperature. The polymerisation temperature did not exceed 77° C.

GPC analysis was carried out on a sample of the latex, which gave the following result: Mn 1396, PDi 2.36 (as determined by GPC calibrated using a polymethyl methacrylate standard).

Neutralisation and viscosity measurement

A sample of the latex (250 g) was taken which was diluted with water (65.5 ml) and neutralised with 25% aqueous ammonia solution (17.3 ml) to give a clear solution with a pH 9.0. The viscosity was measured using a Brookfield viscometer, spindle no 1, spindle speed 60 rpm at a temperature of 28° C. Under these conditions the measured value was 8.9 cps.

LMP2

This was based on a MMA (85 wt %)/MAA (15 wt %) oligomer.

The apparatus used was identical to that described for LMP1.

The experimental procedure followed was as described for LMP1.

The components and the amounts used are listed below.

| Water | 1750 g |
|---|---|
| Sodium lauryl sulphate | 15 g |
| Cyanovaleric acid | 9.5 g |
| Methyl methacrylate | 681 ml |
| Methacrylic acid | 111 ml |
| CoBF | 0.2854 g |

The monomer/CoBF was added at a linear rate over 120 minutes. The reaction was continued for a further hour before cooling to room temperature. The maximum temperature throughout the polymerisation was 74.8° C.

The resulting latex was analyzed by GPC giving Mn 1744 and PDi 2.00.

Neutralisation and viscosity measurement

A sample of the latex (250 g) was diluted with water (94.3 ml) and adjusted to pH 9.0 with 25% aqueous ammonia solution (9.2 ml). The viscosity of the resulting solution was measured as described for LMP1 giving a value of 5.4 cps.

LMP3

This was based on a MMA (50 wt %)/MAA (30 wt %)/St (20 wt %) oligomer.

The apparatus and procedure were the same as described for LMP1 except that the monomer was added over 120 minutes.

The components and the amounts used are given below.

| Water | 1750 g |
|---|---|
| Sodium lauryl sulphate | 15 g |
| Cyanovaleric acid | 9.5 g |
| Methyl methacrylate | 400.6 ml |
| Methacrylic acid | 221.9 ml |
| Styrene | 165 ml |
| CoBF | 0.2976 g |

The final latex was analyzed by GPC to give Mn 4904 and PDi 4.14.

Neutralisation and viscosity measurement

A sample of the latex was taken and diluted with water (113.75 ml) and 25% aqueous ammonia solution (20.0 ml) in a conical flask. After mixing, a double surfaced water condenser was attached to the conical flask and the mixture heated to 80° C. for about 30 minutes. The mixture was allowed to cool to room temperature overnight. The viscosity of the resulting solution was measured in the same way as described for LMP1 to give a value of 47 cps.

LMP4

This was based on a MMA (60 wt %)/MAA (30 wt %)/St (10 wt %) oligomer.

The apparatus and procedure were the same as described for LMP1 except that the monomer/CoBF soluted was fed linearly over 120 minutes.

The components and the amounts used are given below.

| Water | 1750 g |
|---|---|
| Sodium lauryl sulphate | 15 g |
| Cyanovaleric acid | 9.5 g |
| Methyl methacrylate | 480.8 ml |
| Methacrylic acid | 221.9 ml |
| Styrene | 82.5 ml |
| CoBF | 0.2870 g |

The final latex was analyzed by GPC to give Mn 4860 and PDi 2.13.

Neutralisation and viscosity measurement

A sample of the latex (250 g) was taken and diluted with water (110.2 ml) and 25. aqueous ammonia solution (19.8 ml) in a conical flask. After mixing, a double surfaced water condenser was attached to the conical flask and the mixture heated on a water bath at 80° C. for about 30 minutes to give a clear solution. The solution was allowed to cool overnight to room temperature. The viscosity of the resulting solution was measured in the same way as described for LMP1 to give a value of 14.8 cps at pH 9.0.

LMP5

This was based on a MMA (40 wt %)/MAA (30 wt %)/St (30 wt %) oligomer.

The polymerisation apparatus consisted of a 1 litre baffled flanged flask fitted with a stirrer, condenser and dropping funnel. The dropping funnel was fitted with a PTFE stirrer. The apparatus was evacuated and flushed with nitrogen before use. The apparatus was heated to 75° C. using a thermostatic water bath. The polymerisation temperature was monitored using a thermocouple and digital readout.

Procedure

All monomers and water were degassed by passing a nitrogen stream through them for at least one hour before use.

An initiator solution of cyanovaleric acid sodium salt was prepared in a round bottomed flask under nitrogen by taking cyanovaleric acid (6.2 g), sodium hydroxide aq solution (33.2 ml, 1moldm$^{-3}$) and water (84cm$^3$).

An emulsified monomer feed was prepared by preparing a solution of methyl methacrylate (85.5 ml), methacrylic acid (59.2 ml), styrene (66 ml) and CoBF (0.1591 g). The resulting solution was transferred by syringe to the dropping funnel. Water (90.8 ml) and sodium lauryl sulphate (2.17 g) were added to the flask in which the monomer solution had been prepared and was then transferred to the dropping funnel by syringe. The mixture was stirred rapidly to produce a yellow emulsion.

To the polymerisation flask was added water (246 ml), and sodium lauryl sulphate (2.17 g) with constant stirring. When the contents of the reaction flask had reached 75° C., an aliquot of initiator solution (60 ml) was taken by syringe and added to the polymerisation flask. The emulsified monomer feed addition was then commenced. The rest of the initiator solution was fed using a syringe pump at a rate of 0.16 ml/min over the whole of the polymerisation. The total amount of initiator with respect to monomer was 2.25 wt %. The emulsified monomer/CoBF was fed at a constant rate over 120 minutes. The polymerisation temperature did not exceed 75° C.

A sample of the final latex was taken and analyzed by GPC giving Mn 5011 and PDi 2.62.

Neutralisation and viscosity measurement

A sample of the latex (168.27 g) was taken in a conical flask and diluted with water (72.2 ml), and 25% aqueous ammonia solution (11.96 g). After mixing a condenser was attached and the mixture was heated on a water bath at 80° C. for 30 minutes, then left to cool overnight to room temperature. The solution viscosity was measured using the method described for LMPl giving a value of 481 cps at pH 9.0.

LMP6

This was based on a MMA (40 wt %)/MMA (30 wt %)/St (30 wt %) oligomer.

The apparatus, procedure and ingredients (including amounts) were as described in LMP5 except that the emulsifier used was ammonium dodecyl benzene sulphonate (instead of Na lauryl sulphate) with 5.25 g being used in the monomer feed in the dropping funnel and 5.25 g being added to the polymerisation flask. Also the amount of cyanovaleric acid sodium salt initiator solution added initially to the flask was 35.7 ml and the rest was added over the polymerisation at a rate of 0.24 ml/min.

The final latex was analyzed to give a polymer Mn of 5392 and PDi of 2.37.

Neutralisation and viscosity measurement

The procedure followed was the same as described for LMP5. The measured viscosity of the solution at pH 9.0 was 224 cps.

LMP7

This was based on a MMA (50 wt %)/MMA (30 wt %)/St (20 wt %) oligomer.

The polymerisation apparatus consisted of a 2 litre baffled flanged flask fitted with a stirrer and condenser. The apparatus was evacuated and flushed with nitrogen before use. The polymerisation temperature was monitorable using a thermocouple and digital read out. The reaction was heated using a thermostatically controlled water bath.

Procedure

All monomers and water were degassed (deoxygenated) by passing a stream of nitrogen through them for at least one hour before use.

De-oxygenated, de-ionised water (758 ml) and sodium lauryl sulphate (8.4 g) were charged to the reaction flask which was heated to 75° C. and stirred.

An aqueous solution of the cobalt catalyst was prepared. CoPY (1.0592 g) was taken and added to a round bottomed flask. The flask was evacuated and flushed with nitrogen three times. De-oxygenated, de-ionised water (100 g) was added via a syringe to the flask.

The monomer mixture was prepared in a round bottomed flask. The flask was evacuated and flushed with nitrogen three times. Styrene (88 ml), methacrylic acid (118.3 ml) and methyl methacrylate (213.7 ml) were taken by syringe and added to the flask.

Cyanovaleric acid (5.1 g) and water (50 ml) were added to the reaction flask. The monomer mixture and aqueous solution of CoPY were fed using syringes attached to syringe pumps at a linear rate over a period of 120 minutes. The temperature in the reaction flask was maintained at (75±2)° C. during the feed time and for a further 3 hours before cooling to ambient temperature.

The molecular weight of the resulting latex was determined by GPC and gave Mn 3053 and PDi 2.66.

Neutralisation and viscosity measurement

A portion of the latex was diluted with water and neutralised with 25% aqueous ammonia to give a 20 wt % solution of the oligomer at pH 9. The viscosity of this solution was measured as described for LMP1 and found to be 12 cps.

LMP8

This was based on a MMA (70wt %)/MAA (30wt %) oligomer. The polymerisation apparatus used was the same as that described for LMP 7.

Procedure

All monomers and water were degassed (deoxygenated) by passing a stream of nitrogen through them for at least one hour before use.

De-oxygenated deionised water (1150 ml) and sodium lauryl sulphate (10.2 g) were charged to the reaction flask which was heated to 75° C. and stirred.

A clean dry 2-necked round bottomed flask fitted with a nitrogen inlet tube and magnetic stirrer bar was evacuated and flushed with nitrogen three times.

COBF (0.1525 g) was taken and added to the flask, which was then re-evacuated and flushed with nitrogen three times. MMA (374 ml) and MAA (148 ml) were added to the flask containing the COBF with stirring.

Cyanovaleric acid (6.4 g) was added to the reaction flask. After complete dissolution of the cyanovaleric acid (2–3 minutes) the monomer/CoBF mixture was added at a linear rate over 60 minutes using a syringe attached to a syringe pump. The temperature inside the reaction flask was maintained at (75±2)° C. throughout the monomer addition and for a further 4 hours before the resulting polymer latex was allowed to cool.

GPC analysis was carried out on a sample of the latex which gave Mn 1953 and PDi 2.05.

LMP 9

This was based on a MMA (70 wt %)/MAA (30 wt %) oligomer.

The polymerisation apparatus was the same as that described for LMP7.

The experimental procedure followed was as described for LMP8.

The components and the amounts are listed below.

| Water | 450 ml |
|---|---|
| Sodium lauryl sulphate | 4.2 g |
| Cyanovaleric acid | 2.54 g |
| MMA | 150 ml |
| MAA | 59 ml |
| CoBF | 0.0926 g |

The mixture of monomers and CoBF was added to the reaction flask at linear rate over a period of 1 hour. The reaction was continued for a further 4 hours before cooling.

The resulting latex was analysed by GPC giving Mn 2572 and PDi 1.65.

Neutralisation and viscosity measurement

A portion of the latex was diluted with water and neutralised with 25% aqueous ammonia to give a 20 wt % solution at pH 9. The viscosity of this solution was measured as described for LMP 1 and found to be 8 cps.

LMP 10

A CCT-prepared low molecular weight acid functional polymer LMP10 was prepared in an aqueous suspension polymerisation as follows:

To a 1 litre flange flask fitted with stirrer, condenser and thermocouple was added 0.6 g sodium sulphate, 4.0 g HX72 solution (12.5 wt %, polyacrylic acid) and 400 ml distilled water. The flask was kept under a nitrogen blanket. The temperature was increased to 75° C. and a mixture of 50 g MMA, 30 g BMA, 20 g MAA, 0.5 g AIBN and 0.015 g CoPhBF was added in one shot. The temperature was increased to 80° C. and held for 5 hours with continuous stirring. At the end of this time the reaction flask was cooled to ambient temperature. The polymer beads produced were isolated by filtration, washed with water and dried. A sample of the polymer beads was analysed by GPC giving Mn 3846 and PDi 2.87.

Neutralisation and viscosity measurement

A portion of the dry beads was added to water and neutralised with 25% aqueous ammonia to give a 20 wt % solution at pH 9. The viscosity of this solution was measured as described for LMP 1 and found to be 10 cps.

PREPARATION OF SOME INVENTION POLYMER LATICES

Example 1

An aqueous emulsion polymer system was made according to the invention using the low molecular weight polymer aqueous latex LMP1 prepared as described above.

The polymerisation apparatus consists of a 2 litre baffled round bottomed flask fitted with a stirrer, a condenser, a nitrogen inlet tube, a 1 litre dropping funnel and a 100 ml dropping funnel. The polymerisation temperature was monitorable by using a thermocouple and a digital readout. The reaction flask was heated by using a 500 W heating mantle.

Procedure

While stirring, the following substances were added to the reaction flask at room temperature.

797.51 g of LMP1 aqueous latex (not neutralised)
199.51 g of demineralised water
49.17 g of a 25% aqueous ammonium solution.

This mixture was stirred for about 15 minutes to obtain a homogeneous solution. To this solution was then added 238.6 g of demineralised water, 16.5 g of Akyposal OP 245 V (a 70 w/w % aqueous solution of a non-ionic surfactant) and 1.15 g of ammonium persulphate. A monomer feed for a hydrophobic polymer was prepared by charging 397.7 g of styrene to the 1 litre dropping funnel. A separate initiator feed was prepared by dissolving 2.19 g ammonium persulphate in 70.72 g of demineralised water and charging this solution to the 100 ml funnel.

The reaction flask was flushed with nitrogen and while stirring the temperature was raised to 85°–90° C. Throughout the polymerisation process these conditions were maintained.

When the reaction temperature had been reached, the monomer feed and the initiator feed were started simultaneously. The monomer feed was fed into the reactor over 2 hours; the initiator feed was also fed into the reactor over 2 hours. After completion of both feeds, the reaction flask was kept at the reaction temperature for another hour before cooling to room temperature.

The resulting latex was sieved over a low mesh screen.

The resulting latex had a solids content of 35.0% (w/w) and a residual styrene content of 0.6% (v/v on latex).

Example 2

An aqueous emulsion polymer system was made according to the invention using the low molecular weight polymer aqueous latex LMP2 prepared as described above.

The apparatus and procedure were as described in Example 1. The components and amounts used are given below:

| | |
|---|---:|
| LMP2 | 691.456 g |
| Water | 243.83 g |
| 25% aq ammonia | 46.582 g |
| Sodium lauryl sulphate (30% aq solution) | 28.409 g |
| Ammonium persulphate | 2.365 g |
| Styrene | 392.747 g |
| Water (in feed) | 94.619 g |

The resulting latex had a solids content of 40% (w/w) and a residual styrene content of 0%.

Example 3

An aqueous emulsion polymer system was made according to the invention using the low molecular weight polymer aqueous latex LMP3 prepared as described above.

The apparatus and procedure were as described in Example 1. The components and amounts used are given below:

| | |
|---|---:|
| LMP3 | 652.028 g |
| Water | 282.715 g |
| 25% aq ammonia | 46.554 g |
| Akyporox OP 250V (70%) | 16.374 g |
| Ammonium persulphate | 1.138 g |
| Water (in feed) | 106.526 g |
| Styrene | 392.515 g |
| Ammonium persulphate (3% aq) | 71.961 g |

The resulting latex had a solids content of 40% (w/w) and a residual styrene content of 0.4% (% v/v on latex).

Example 4

An aqueous emulsion polymer system was made according to the invention using the low molecular weight polymer aqueous latex LMP4 prepared as described above.

S The apparatus and procedure were as described in Example 1. The components and amounts are given below:

| | |
|---|---:|
| LMP4 | 658.537 g |
| Water | 276.15 g |
| 25% aq ammonia | 46.554 g |
| Akyporox OP 250V (70%) | 16.373 g |
| Ammonium persulphate | 1.138 g |
| Water (in feed) | 106.526 g |
| Styrene | 392.515 g |
| Ammonium persulphate (3% aq) | 71.961 g |

The resulting latex had a solids content of 40% (w/w) and a residual styrene content of 0.16% (t v/v).

Example 5

An aqueous emulsion polymer system was made according to the invention using the low molecular weight polymer aqueous latex LMP6 prepared as described above.

The polymerisation apparatus consisted of a 2 litre baffled flanged flask fitted with a steel stirrer, a PTFE stirrer gland, a condenser, a thermocouple and a dropping funnel. The dropping funnel was fitted with a glass stirred gland and a PTFE stirrer. The apparatus was heated using a thermostatically controlled water bath. The apparatus was flushed with nitrogen before use.

Procedure

The oligomer aqueous emulsion LMP6 (222 g, not neutralised) as prepared above was taken, diluted with water (94.2 g), and the pH adjusted to 9.0 with 25% aqueous ammonia solution. The viscosity of the resulting solution was measured using a Brookfield viscometer at 20° C. giving a value of 224 cps.

The neutralised oligomer solution was taken and added to the polymerisation flask. The solution was stirred and heated to 85° C.

Water (131.4 g), sodium lauryl sulphate (1.0 g), styrene (200 g) and ammonium persulphate (1.0 g) were taken in a glass beaker and stirred until a white emulsion was produced. The emulsion was added to the dropping funnel and stirred.

A portion of the emulsified feed (10%) was added to the polymerisation flask. After 5 minutes the emulsified feed was resumed. The feed was completed over 60 minutes and the polymerisation heated for a further 105 minutes. The emulsion was then cooled to room temperature.

A sample of the emulsion was taken and analyzed by GPC giving a value of Mn 187667 and PDi 2.57.

Example 6

An aqueous emulsion polymer system was made according to the invention using the low molecular weight polymer aqueous latex LMP5 prepared as described above, which however was first evaporated to dryness to form solid and subsequently redissolved prior to the polymerisation stage to form the hydrophobic polymer.

The polymerisation apparatus used was as described for Example 5.

A sample of the oligomer aqueous emulsion LMP5 (not neutralised) was taken and evaporated to dryness on a water bath at 70° C. The solid was ground to a powder using a mortar and pestle and dried for 60 minutes in a vacuum oven at 80° C. A portion of the oligomer powder (66.7 g) was taken in a conical flask and to this was added water (250 ml). 25% Aqueous ammonia solution was added until the pH was 9. The viscosity of the resulting solution was measured using a Brookfield viscometer at 23° C., giving a value of 481 cps.

The oligomer solution was added to the polymerisation flask and heated with stirring to 85° C.

A styrene polymerisation was then performed as described for Example 5.

A sample of the emulsion was taken and analyzed by GPC giving a value of 246492 for Mn and a value of 2.49 for PDi.

Example 7

An aqueous emulsion polymer system was made according to the invention using the low molecular weight polymer aqueous latex LMP7 prepared as described above.

The polymerisation apparatus consisted of a 1 litre baffled round bottomed flask fitted with a stirrer, condenser, a nitrogen inlet tube and pressure equalising dropping funnel. The dropping funnel was fitted with a stirrer.

The following substances were mixed with stirring:

133.3 g of LMP7 aqueous latex (not neutralised)

56.7 ml of deionised water 10.4 ml of 0.88 aqueous ammonia solution.

After complete dissolution, the solution was adjusted to pH 9.0 by dropwise addition of 0.88 aqueous ammonia solution. The oligomer solution so formed was added to the polymerisation flask and heated to 85° C. using a heating mantle.

Water (60 g), styrene (120 g), sodium lauryl sulphate (0.6 g) and ammonium persulphate (0.6 g) were taken in a glass jar and stirred until a white emulsion was produced. This emulsion was added to the dropping funnel of the polymerisation apparatus.

A portion of the emulsified feed (10%) was added rapidly to the polymerisation flask. After 5 minutes, the emulsified feed was resumed with a linear feed which was complete in 60 minutes. The polymerisation flask was maintained at 85° C. during the feed and for a further 60 minutes before cooling to ambient temperature.

A sample of the polymer latex produced was taken and analysed by GPC. The chromatogram was bimodal giving a value of Mn 35096 and Mw 436748.

Example 8

An aqueous emulsion polymer system was made according to the invention using the low molecular weight polymer aqueous latex LMP7 prepared as described above.

The apparatus and procedure was as described in Example 7. The components and amounts are given below:

Initially in reaction vessel 133.3 g of LMP7 aqueous latex (not neutralised)

56.7 ml of deionised water 10.4 ml of 0.88 aqueous ammonia solution.

After complete dissolution, the solution was adjusted to pH 9.0 by dropwise addition of 0.88 aqueous ammonia solution.

Emulsified feed 76 g of styrene 4 g of glycidyl methacrylate 40 g water 0.4 g sodium lauryl sulphate 0.4 g ammonium persulphate

Example 9

An aqueous emulsion polymer system was made according to the invention using the low molecular weight polymer aqueous latex LMP7 prepared as described above.

The apparatus and procedure were as described in Example 7. The components and amounts are given below:

Initially in reaction vessel 266.6 g of LMP7 aqueous latex (not neutralised)

113.4 g of deionised water 20.8 ml of 0.88 aqueous ammonia solution

After complete dissolution, the solution was adjusted to pH 9.0 by dropwise addition of 0.88 aqueous ammonia solution.

Emulsified feed 44 ml of styrene 44.7 ml of n-butyl acrylate 40.1 ml water

0.6g sodium lauryl sulphate 0.6 g ammonium persulphate

A sample of the polymer latex produced was taken and analysed by GPC. The chromatogram was bimodal giving a value of Mn 4195 and Mw 119636.

A portion (80 g) of the polymer latex produced in this Example was formulated with the following components to produce a white water-borne ink.

120 g of titanium dioxide (grade TR80 supplied by Tioxide)

10 g of n-propyl alcohol 50 g water

The components were mixed together in a high shear mixer at ca. 4000 rpm resulting in a homogeneous dispersion of the pigment. The pH of the ink was 8.1.

The ink was coated onto corona treated polyester film and dried in an oven at 80° C. for 20 seconds. The ink coating was shown to be water resistant as it was not removed from the film by rubbing with a cotton wool swab soaked in water. Reversibility of the ink was demonstrated as the dried ink was readily removed from the film and redispersed in the wet ink when rubbed with a cotton wool swab soaked in the ink.

Example 10

An aqueous emulsion polymer was made according to the invention using the low molecular weight polymer aqueous latex LMP8 as described above.

The polymerisation apparatus consisted of a 5 litre baffled round bottomed flask fitted with a stirrer, a condenser, 3 pressure equalising dropping funnels and a nitrogen inlet tube. The reaction flask was heated by a heating mantle.

The following substances were added to the reaction flask:

1400 g of LMP8 aqueous latex (not neutralised)
1180 g of deionised water

The contents of the reaction flask were heated to 60° C. with a small stream of nitrogen being passed through them until the temperature of 60° C. was reached. Aqueous solutions of ascorbic acid (6 g in 180 ml deionised water) and tBHPO (6 g in 180 ml deionised water) were prepared. 40 mls of each of the ascorbic acid and tBHPO solutions were added to the reaction flask. 630 g of MMA and 630 g of BA were mixed with 6 g of Aerosol OT solution (75% wt/wt in water/ethanol as supplied by Cyanamid) and added to one of the dropping funnels. This monomer mixture was added to the reaction flask at a rate of 600 ml/hour. The remaining 140 mls of both the solutions of tBHPO and ascorbic acid were fed to the reaction vessel from the other dropping funnels at a rate of 60 mls/hour commencing at the same time as the mixed monomer feed. The temperature was maintained at 60° C. for 30 minutes after completion of the monomer feed.

The resulting aqueous polymer latex was cooled to 30° C. and sieved over a low mesh screen. A sample of the aqueous polymer latex produced was taken and analysed by GPC. The chromatogram was multimodal giving a value of Mn 7462, Mw 244905 and PDi 32.8.

A dry polymer powder was recovered by spray drying the aqueous latex. A portion of the dry polymer powder was readily redispersed in an aqueous solution at pH 8.5.

Example 11

An aqueous emulsion polymer system was made according to the invention using the low molecular weight polymer aqueous latex LMP 9 prepared as described above.

The polymerisation apparatus consisted of a 1 litre baffled round bottomed flask fitted with a stirrer, condenser and a nitrogen inlet tube.

While stirring the following substances were added to the reaction flask at ambient temperature:

229 g of LMP9 aqueous latex (not neutralised)
57 g of degassed deionised water
14.1 g of 25% aqueous ammonia solution The mixture was stirred for 15 minutes to obtain a homogenous solution. Additional 25% aqueous ammonia solution was added dropwise until the mixture reached pH9.68.4 g deoxygenated deionised water, 4.73 g of Akyponox OP 250 V (71 wt % aqueous solution) a non ionic surfactant and 1.15 g of ammonium persulphate were added to the reaction flask. The temperature of the reaction flask was raised to 85° C.

114 g of styrene and a solution of 0.628 g of ammonium persulphate in 20.3 g of water were fed to the reaction flask at a linear rate over a period of 2 hours using separate syringes attached to syringe pumps. The temperature inside the reaction vessel was maintained at 85° C. for 6 hours after the feeds had finished before allowing to cool.

A sample of the aqueous polymer latex produced was taken and analysed by GPC. The chromatogram was bimodal giving a value of Mn 5825, Mw 204206 and PDi 35.06. From the high molecular weight peak in the chromatogram it was estimated that the high molecular weight hydrophobic polymer had a value of Mn 90000, Mw 310000 and PDi 3.5.

Example 12

An aqueous emulsion polymer system was made according to the invention using the low molecular weight polymer LMP 10 prepared as described above.

The polymerisation apparatus consisted of a 1 litre baffled round bottomed flask fitted with a stirrer, condenser and a nitrogen inlet tube.

60 g of dry low molecular weight polymer beads LMP 10 were mixed with 220 g of water and 9 ml of 25% aqueous ammonia solution resulting in a solution of pH9. Further water (approximately 11g) was added to make the total mass of solution 300 g. This solution of LMP 10 was added to the reaction flask together with:

| | |
|---|---|
| sodium lauryl sulphate | 1.5 g |
| Akyponox OP 250V (71 wt % aqueous solution) | 4.40 g |
| ammonium persulphate | 1.06 g |
| Water | 30 g |

The temperature of the reaction flask was raised to 85° C. 116 ml of styrene and a solution of 0.58 g of ammonium persulphate in 20 ml of water were fed to the reaction flask at a linear rate over a period of 2 hours using separate syringes attached to syringe pumps. The temperature inside the reaction vessel was maintained at 85° C. for 4 hours after the feeds had finished before allowing to cool.

A sample of the aqueous polymer latex produced was taken and analysed by GPC. The chromatogram was bimodal giving a value of Mn 36308, Mw 597563 and PDi 16.46.

We claim:

1. Process for the production of an aqueous polymer emulsion which process comprises:

a) preparing a low molecular weight polymer containing acid-functional groups using a free-radical polymerisation process which employs a freeradical initiator and, for the purpose of controlling molecular weight, a transition netal chelate complex, wherein said low molecular weight polymer has a number average molecular weight within the range of from 500 to 50,000;

b) conducting al aqueous polymerisation process to form an aqueous emulsion of a hydrophobic polymer from at least one olefinically unsaturated monomer, wherein the low molecular weight polymer of step a) is introduced to the aqueous medium of said emulsion polymerisation process before the start of and or during said emulsion polymerisation process and becomes dissolved or dispersed in said aqueous medium, said transition metal chelate in step a) being a cobalt chelate complex and said low molecular weight polymer in step a) prepared by an aqueous emulsion or suspension polymerisation process.

2. Process according to claim 1 wherein said low molecular weight polymer is fully dissolvable in an aqueous medium.

3. Process according to claim 1 wherein said low molecular weight polymer becomes dissolved in the aqueous medium of the polymerisation of step b), and wherein dissolution is achieved by neutralization of the acid-functional groups thereof.

4. Process according to claim 3 wherein neutralization is effected by raising the pH of the aqueous medium.

5. Process according to claim 2 wherein said low molecular weight polymer becomes dissolved in the aqueous medium of the polymerisation of step b), wherein, subject to when it is added to the aqueous medium, dissolution is effected or takes place prior to the start of the polymerisation of step b), or during the polymerisation of step b), or subsequent to the polymerisation of step b), or over at least two of these stages.

6. Process according to claim 1 wherein said low molecular weight polymer is partially dissolvable in an aqueous medium.

7. Process according to claim 6 wherein said low molecular weight polymer becomes colloidally dispersed in the aqueous polymerisation medium of step b).

8. Process according to claim 7 wherein said dispersion is facilitated by neutralization of the acid-functional groups of the low molecular weight polymer.

9. Process according to claim 1 wherein the monomer system used for the preparation of the acid-functional polymer is that to provide a copolymer of at least one olefinically unsaturated acid-functional comonomer and at least one olefinically unsaturated non-acid-functional comonomer.

10. Process according to claim 9 wherein the monomer system used comprises 1–60 weight % of acid-functional monomer(s) and 99–40 weight % of non-acid-functional components(s).

11. Process according to claim 10 wherein the monomer system used comprises 5–40 weight % of acid-functional comonomer(s) and 95–60 weight % of non-acid-functional comonomer(s).

12. Process according to claim 10 wherein the monomer system used comprises 15–40 weight % of acid-functional comonomer(s) and 85–60 weight % of non-acid-functional comonomer(s).

13. Process according to claim 9 wherein said acid-functional comonomer(s) comprises a carboxyl-functional comonomer(s) thereby to provide carboxyl-functional groups in the resulting low molecular weight polymer.

14. Process according to claim 13 wherein the acid-functional comonomer(s) comprises methacrylic acid.

15. Process according to claim 9 wherein said acid functional comonomer(s) comprises acrylic acid.

16. Process according to claim 9 wherein said acid-functional comonomer(s) comprises fumaric acid, maleic acid or itaconic acid.

17. Process according to claim 9 wherein said acid-functional comonomer(s) comprises a sulphonic acid bearing monomer, thereby to provide sulphonic acid functional groups in the resulting low molecular weight polymer.

18. Process according to claim 9 wherein the non-acid-functional comonomer(s) comprises at least one monomer selected from alkyl methacrylates, alkyl acrylates, styrenes, dienes and vinyl esters.

19. Process according to claim 18 wherein said alkyl methacrylates are C1 to C10 alkyl methacrylates, said alkyl acrylates are C1 to C10 alkyl acrylates and said styrenes are styrene itself, $\alpha$-methyl styrene and t-butyl styrene.

20. Process according to claim 9 wherein said non-acid-functional comonomer(s) comprises an olefinically unsaturated nitrile(s), or an olefinically unsaturated halide(s).

21. Process according to claim 9 wherein part of said non-acid-functional comonomers comprises a functional monomer(s).

22. Process according to claim 21 wherein said functional monomer(s) provides subsequent crosslinkability in the resulting polymer system.

23. Process according to claim 21 wherein said functional monomer(s) is selected from alkyl, glycidyl, and hydroxyalkyl methacrylates and acrylates, ketofunctional monomers, and non-ketofunctional amide monomers.

24. Process according to claim 23 wherein said ketofunctional monomers are acetoacetoxy esters of hydroxyalkyl acrylates and methacrylates, preferably acetoacetoxyethyl methacrylate, keto-containing amides, preferably diacetone acrylamide, and said non-ketofunctional amide monomers are acrylamide and methacrylamide.

25. Process according to claims 11 wherein said copolymer is derived from a monomer system which comprises 10–30 weight % of methacrylic acid, 50–90 weight % of methyl methacrylate, 0–30 weight % of one or both of n-butyl methacrylate and n-butyl acrylate, and 0–40 weight % of styrene.

26. Process according to claim 9 wherein said copolymer is derived from a monomer system which comprises 15–40 weight % of methacrylic acid, 50–85 weight % of methyl methacrylate, 0–30 weight % of one or both of n-butyl methacrylate and n-butyl acrylate, and 0–35 weight % of styrene.

27. Process according to claim 1 wherein at least 50 weight % of the monomer system used in the polymerisation in stage a) is a monomer(s) having a $CH_2=C(CH_3)$— moiety.

28. Process according to claim 1 wherein said low molecular weight polymer has a number average molecular weight within the range 1000 to 10,000.

29. Process according to claim 1 wherein the monomer(s) used in the preparation of the hydrophobic polymer comprises at least one monomer selected from styrenes, alkyl acrylates, alkyl methacrylates, vinyl esters, vinyl halides, vinylidene halides, and dienes.

30. Process according to claim 29 wherein the styrenes are styrene itself, $\alpha$-methyl styrene, o-, m- and p- styrene, o-, m- and p-ethylstyrene, p-chlorostyrene and p-bromostyrene; the alkyl acrylates and methacrylates are those having C–10 alkyl; the vinyl halide is vinyl chloride; the vinylidene halide is vinylidene chloride; the vinyl ester is vinyl acetate; and the dienes are 1,3-butadiene or isoprene.

31. Process according to claim 1 wherein part of the monomer system used in the preparation of the hydrophobic polymer comprises a functional monomer(s).

32. Process according to claim 31 wherein said functional monomer(s) provides subsequent crosslinkability in the resulting polymer system.

33. Process according to claim 31 wherein said functional monomer(s) is selected from alkyl, glycidyl, and hydroxyalkyl methacrylates and acrylates, ketofunctional monomers, and non-ketofunctional amide monomers.

34. Process according to claim 33 wherein said ketofunctional monomers are acetoacetoxy esters of hydroxyalkyl acrylates and methacrylates, preferably acetoacetoxyethyl methacrylate, keto-containing amides, preferably diacetone acrylamide, and said non-ketofunctional amide monomers are acrylamide and methacrylamide.

35. Process according to claim 1 wherein the concentration of acid functional monomer units in the hydrophobic polymer is less than the concentration of acid functional monomer units in the low molecular weight acid functional monomer.

36. Process according to claim 1 wherein the monomer system used in the preparation of the hydrophobic polymer contains less than 10 weight % of any acid-functional monomer.

37. Process according to claim 36 wherein the monomer system contains less than 5 weight % of any acid-functional comonomer.

38. Process according to claim 36 wherein the monomer system contains no acid-functional comonomer.

39. Process according to claim 1 wherein the hydrophobic polymer is made from a monomer system comprising at least one of styrene, C1–10 alkyl acrylate, and C–10 alkyl methacrylate.

40. Process according to claim 39 wherein the hydrophobic polymer is a styrene homopolymer.

41. Process according to claim 1 wherein the hydrophobic polymer has a number average molecular weight of at least 50,000.

42. Process according to claim 41 wherein the hydrophobic polymer has a number average molecular weight of at least 100,000.

43. Process according to claim 1 wherein in said process, the low molecular weight polymer in the form of a solid isolated from its preparative polymerisation medium, is dissolved or dispersed in an aqueous medium which is then used as the basis for the aqueous medium of the polymerisation of step b).

44. Process according to claim 1 wherein in said process, a water-miscible organic solvent solution of the low molecular weight polymer is diluted with water so as to provide an aqueous solution or dispersion of the polymer, and this aqueous solution or dispersion is used as the basis for the aqueous medium of the polymerisation of step b).

45. Process according to claim 1 wherein in said process, an aqueous emulsion of the low molecular weight polymer resulting from polymerisation in step a) is used as the basis for the aqueous medium of the polymerisation of step b).

46. Process according to claim 45 wherein the polymerisation processes in steps a) and b) are carried out in the same polymerisation vessel.

47. Process according to claim 45 wherein the low molecular weight polymer is deployed to act as an emulsifying agent in the polymerisation of step b).

48. Aqueous polymer emulsion which is formed by a process according claim 1.

* * * * *

UNITED STATES PATENT AND TRADEMARK OFFICE
CERTIFICATE OF CORRECTION

PATENT NO. : 5,804,632
DATED : September 8, 1998
INVENTOR(S) : Haddleton, et al.

It is certified that error appears in the above-indentified patent and that said Letters Patent is hereby corrected as shown below:

ON THE Title page, item

[73] Assignees: Please change resident city of the second assignee from "Vaalwijk" to --Waalwijk--.

Col. 15, lines 21-22, change "MMA(40wt%)/MMA(30wt%)/St(30wt%)" to --MMA(40wt%)/MAA(30wt%)/St(30wt%)--.

Col. 15, lines 39-40, change "MMA(50wt%)/MMA(30wt%)/St(20wt%)" to --MMA(50wt%)/MAA(30wt%)/St(20wt%)--.

Col. 18, at the beginning of line 41, delete "S".

Col. 22, line 54, change "freeradical" to --free-radical--.

Col. 22, line 60, change "al" to --an--.

Col. 23, line 3, before "prepared", insert --being--.

Col. 24, line 24, change "claims 11" to --claim 9--.

UNITED STATES PATENT AND TRADEMARK OFFICE
CERTIFICATE OF CORRECTION

PATENT NO. : 5,804,632
DATED : September 8, 1998
INVENTOR(S) : Haddleton, et al.

It is certified that error appears in the above-indentified patent and that said Letters Patent is hereby corrected as shown below:

Col. 25, line 20, change "C-10" to --C1-10--.

Signed and Sealed this

Second Day of November, 1999

Attest:

Q. TODD DICKINSON

Attesting Officer

Acting Commissioner of Patents and Trademarks